(12) United States Patent
Kong et al.

(10) Patent No.: US 7,535,798 B2
(45) Date of Patent: May 19, 2009

(54) METHOD, SYSTEM, AND MEDIUM FOR ESTIMATING LOCATION USING ULTRASONIC WAVES

(75) Inventors: Dong-geon Kong, Yongin-si (KR); Seok-won Bang, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 309 days.

(21) Appl. No.: 11/397,721

(22) Filed: Apr. 5, 2006

(65) Prior Publication Data

US 2006/0239121 A1   Oct. 26, 2006

(30) Foreign Application Priority Data

Apr. 21, 2005   (KR) .................... 10-2005-0033247

(51) Int. Cl.
*G01S 5/30* (2006.01)
(52) U.S. Cl. ..................................... 367/128
(58) Field of Classification Search ............. 367/117, 367/118, 124, 127–129, 197, 907; 381/303, 381/103
See application file for complete search history.

(56) References Cited

U.S. PATENT DOCUMENTS

| 4,814,552 | A | 3/1989 | Stefik et al. |
| 5,191,328 | A | 3/1993 | Nelson |
| 5,892,501 | A * | 4/1999 | Kim et al. .................... 345/158 |
| 6,674,687 | B2 * | 1/2004 | Zeitzew .......................... 367/6 |
| 7,123,731 | B2 * | 10/2006 | Cohen et al. ................. 381/303 |
| 2003/0031333 | A1 * | 2/2003 | Cohen et al. ................. 381/303 |
| 2004/0133535 | A1 * | 7/2004 | Scharler et al. ............. 706/928 |
| 2006/0239121 | A1 * | 10/2006 | Kong et al. .................. 367/128 |

FOREIGN PATENT DOCUMENTS

| EP | 1717597 A2 * | 11/2006 |
| JP | 2006300953 A * | 11/2006 |
| WO | 03/088136 | 10/2003 |

OTHER PUBLICATIONS

European Search Report dated Mar. 27, 2007, issued in corresponding European Patent Application No. 06251926.9.

* cited by examiner

*Primary Examiner*—Dan Pihulic
(74) *Attorney, Agent, or Firm*—Staas & Halsey LLP

(57) ABSTRACT

Provided are a method, system, and medium for estimating a location of a remote controller using ultrasonic waves. The method includes receiving a plurality of signals transmitted from the remote controller, measuring time delays between an infrared signal and ultrasonic signals included in each of the received signals, estimating the location of the remote controller with respect to each of the received signals using the measured time delays, and estimating the final location of the remote controller based on the estimated locations of the remote controller.

47 Claims, 15 Drawing Sheets

EXCLUDED LOCATIONS
(EXCLUDE 20% FROM BOTH ENDS)

METHOD, SYSTEM, AND MEDIUM FOR ESTIMATING LOCATION USING ULTRASONIC WAVES

CROSS-REFERENCE TO RELATED APPLICATIONS

This application claims the benefit of Korean Patent Application No. 10-2005-0033247 filed on Apr. 21, 2005 in the Korean Intellectual Property Office, the disclosure of which is incorporated herein by reference in its entirety.

BACKGROUND OF THE INVENTION

1. Field of the Invention

The present invention relates to location estimation using ultrasonic waves, and more particularly, to a method and system for estimating two-dimensional location information of a remote controller using an infrared signal having a plurality of pulse groups and ultrasonic signals emitted by the remote controller.

2. Description of the Related Art 5.1 channel speakers are generally used to reproduce surround sound. In this case, however, a user must buy separate speakers and secure the space to properly install them.

To address this problem, a method of reproducing surround sound using two speakers placed at both sides of a device, such as a digital TV, has been suggested. However, in this case, since a sweet spot range is merely of about 10 degrees, the quality of surround sound is significantly lower in locations out of the sweet spot range.

Thus, when a user employs a remote controller to control a device that reproduces surround sound, it is necessary to provide an apparatus which enables the device to reproduce surround sound with a proper direction and volume according to the location of the user, by recognizing the two-dimensional location of the remote controller.

SUMMARY OF THE INVENTION

Additional aspects, features, and/or advantages of the invention will be set forth in part in the description which follows and, in part, will be apparent from the description, or may be learned by practice of the invention.

The present invention provides a method and system for receiving an infrared signal having a plurality of pulse groups and ultrasonic signals transmitted after the infrared signal from a predetermined wireless remote controller and estimating the two-dimensional location of the wireless remote controller by a surround sound reproduction apparatus having one infrared receiving sensor and two ultrasonic wave receiving sensors.

The above as well as other aspects, features and advantages, of the present invention will become clear to those skilled in the art upon review of the following description.

According to an aspect of the present invention, there is provided a method for estimating a location using ultrasonic waves. The method includes receiving a plurality of signals transmitted from a remote controller, measuring time delays between an infrared signal and ultrasonic signals included in each of the received signals, estimating locations of the remote controller with respect to each of the received signals using the measured time delays, and estimating the final location of the remote controller based on the estimated locations of the remote controller.

According to another aspect of the present invention, there is provided a method for estimating a location using ultrasonic waves, the method including (a) receiving a plurality of signals transmitted from a remote controller, (b) measuring time delays between an infrared signal and ultrasonic signals included in each of the received signals, (c) calculating an average of time delays measured for the received signals, and (d) estimating the location of the remote controller using the calculated averages.

According to still another aspect of the present invention, there is provided a remote controller including an infrared signal transmitting module which transmits infrared signals, an ultrasonic signal transmitting module which transmits ultrasonic signals, and an originating signal control module which transmits a plurality of originating signals including the infrared signals and the ultrasonic signals.

According to yet another aspect of the present invention, there is provided a receiver including an infrared signal receiving module which receives an infrared signal from a remote controller that transmits a plurality of signals including infrared signals and ultrasonic signals, a first ultrasonic signal receiving module which receives an ultrasonic signal, a second ultrasonic signal receiving module which is separated from the first ultrasonic signal receiving module by a predetermined distance and receives the ultrasonic signal, a time delay calculating module which measures an origination time of the ultrasonic signal using the infrared signal and measures a first time delay between the measured origination time of the ultrasonic signal and the receipt time of the ultrasonic signal by a first ultrasonic wave receiving sensor and a second time delay between the measured origination time of the ultrasonic signal and a receipt time of the ultrasonic signal by a second ultrasonic wave receiving sensor, and a location calculating module which estimates the location of the remote controller with respect to each of the received signals transmitted by the remote controller using the measured time delays and estimates the final location of the remote controller based on the estimated locations of the remote controller.

According to a further aspect of the present invention, there is provided a receiver including an infrared signal receiving module which receives an infrared signal from a remote controller that transmits a plurality of signals including infrared signals and ultrasonic signals, a first ultrasonic signal receiving module which receives an ultrasonic signal, a second ultrasonic signal receiving module which is separated from the first ultrasonic signal receiving module by a predetermined distance and receives the ultrasonic signal, a time delay calculating module which measures an origination time of the ultrasonic signal using the infrared signal, measures a first time delay between the measured origination time of the ultrasonic signal and a receipt time of the ultrasonic signal by a first ultrasonic wave receiving sensor and a second time delay between the measured origination time of the ultrasonic signal and a receipt time of the ultrasonic signal by a second ultrasonic wave receiving sensor, and calculates an average of the first time delays measured for the received signals and an average of the second time delays measured for the received signals, and a location calculating module which estimates the location of the remote controller using the calculated averages.

According to yet a further aspect of the present invention, there is provided a system for estimating a location using ultrasonic waves, the system including a remote controller which transmits a plurality of signals including infrared signals and ultrasonic signals, and a receiver which receives the plurality of signals, measures time delays between an infrared signal and ultrasonic signals included in each of the received signals, estimates the location of the remote controller with respect to each of the received signals using the measured time delays, and estimates the final location of the remote controller based on the estimated locations of the remote controller.

According to still yet another aspect of the present invention, there is provided a system for estimating a location using ultrasonic waves, the system including a remote controller which transmits a plurality of signals including infrared signals and ultrasonic signals, and a receiver which receives the plurality of signals, measures time delays between an infrared signal and ultrasonic signals included in each of the received signals, calculates an average of the measured time delays for the received signals, and estimates the location of the remote controller using the calculated averages.

According to a further aspect of the present invention, there is provided at least one computer readable medium storing instructions that control at least one processor to perform a method for estimating a location using ultrasonic waves including receiving a plurality of signals transmitted from a remote controller; measuring time delays between an infrared signal and an ultrasonic signal included in each of the received signals; estimating locations of the remote controller with respect to each of the received signals using the measured time delays; and estimating the final location of the remote controller based on the estimated locations of the remote controller.

According to a further aspect of the present invention, there is provided at least one computer readable medium storing instructions that control at least one processor to perform a method for estimating a location using ultrasonic waves including receiving a plurality of signals transmitted from a remote controller; measuring time delays between an infrared signal and an ultrasonic signal included in each of the received signals; calculating an average of time delays measured for the received signals; and estimating the location of the remote controller using the calculated averages.

According to a further aspect of the present invention, there is provided a method for estimating a location of a remote controller, the method including receiving an infrared signal and an ultrasonic signal; measuring a first time delay between the received infrared signal and the ultrasonic signal received by a first sensor; measuring a second time delay between a received infrared signal and the ultrasonic signal received by a second sensor; and estimating the location of the remote controller based on the first time delay, the second time delay, and predetermined locations of the first and second sensor.

According to a further aspect of the present invention, there is provided at least one computer readable medium storing instructions that control at least one processor to perform a method for estimating a location of a remote controller including receiving an infrared signal and an ultrasonic signal; measuring a first time delay between the received infrared signal and the ultrasonic signal received by a first sensor; measuring a second time delay between a received infrared signal and the ultrasonic signal received by a second sensor; and estimating the location of the remote controller based on the first time delay, the second time delay, and predetermined locations of the first and second sensors.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
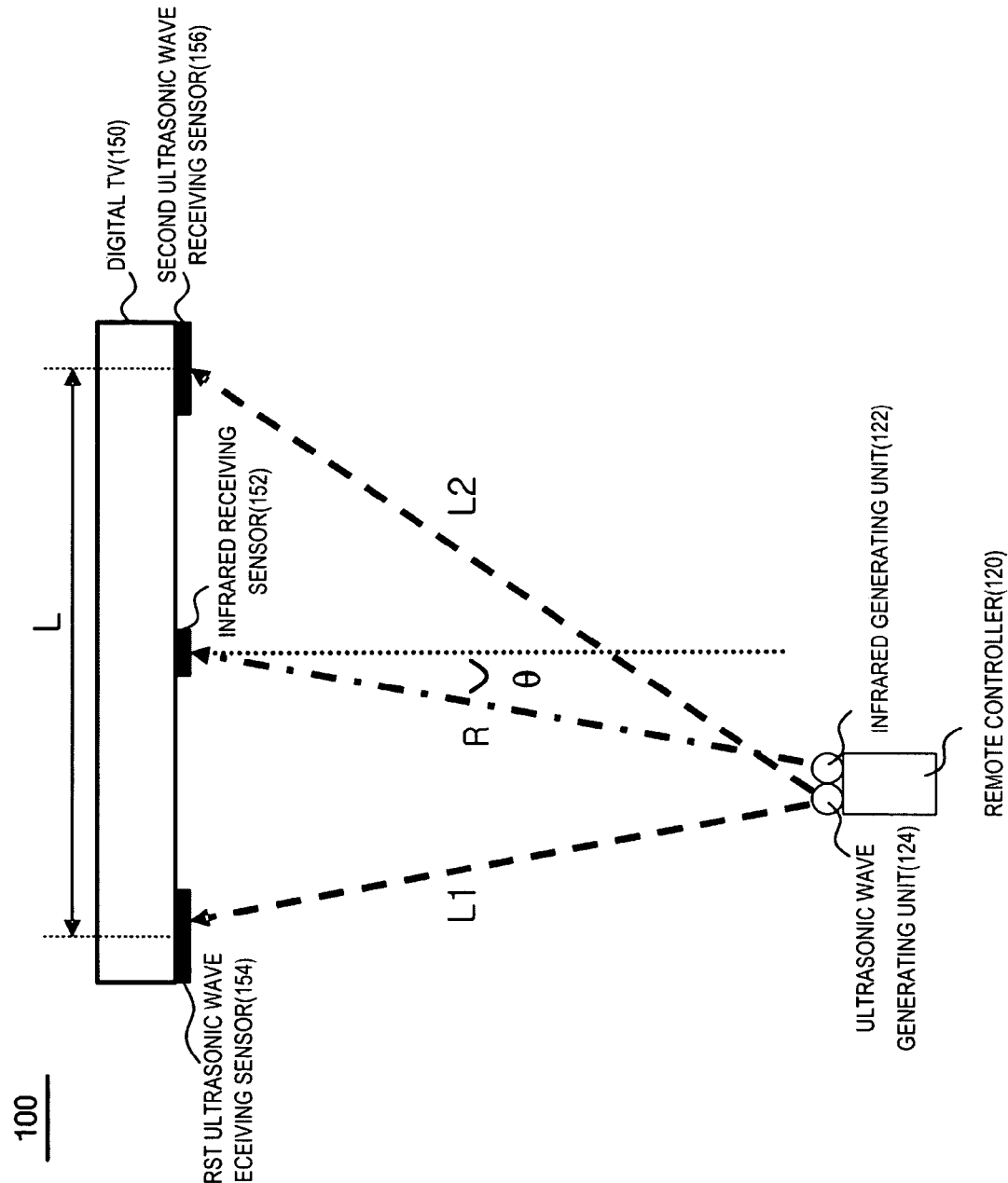
FIG. 1 illustrates a system for estimating the location of a remote controller using ultrasonic waves and parameters required for location estimation, according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A system for estimating the location of a remote controller using ultrasonic waves and parameters required for location estimation according to an exemplary embodiment of the present invention will be described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 illustrates a system 100 for estimating the location of a remote controller using ultrasonic waves and parameters required for location estimation, according to an exemplary embodiment of the present invention. Referring to FIG. 1, the system 100 includes a digital TV 150 having speakers that reproduce surround sound and a remote controller 120 that controls the digital TV.

The remote controller 120 includes an infrared generating unit 122 that transmits infrared signals and an ultrasonic wave generating unit 124 that transmits ultrasonic signals.

The digital TV 150 includes an infrared receiving sensor 152 that receives infrared signals transmitted from the infrared generating unit 122 and a first ultrasonic wave receiving sensor 154 and a second ultrasonic wave receiving sensor 156 that receive ultrasonic signals transmitted from the ultrasonic wave generating unit 124. As shown in FIG. 1, it is preferable that the first ultrasonic wave receiving sensor 154 and the second ultrasonic wave receiving sensor 156 be located in opposite directions at a distance L2 from the center between them, i.e., the infrared receiving sensor 152. In other words, a distance between the first ultrasonic wave receiving sensor 154 and the second ultrasonic wave receiving sensor 156 is L.

It is also assumed that a distance between the remote controller 120 and the infrared receiving sensor 152 is R, a distance between the remote controller 120 and the first ultrasonic wave receiving sensor 154 is L1, a distance between the remote controller 120 and the second ultrasonic wave receiving sensor 156 is L2, and an angle between the remote controller 120 and the infrared receiving sensor 152 is $\theta$.

In the present exemplary embodiment, the digital TV 150 calculates first distance information corresponding to L1 and second distance information corresponding to L2 using time delays between an infrared signal and ultrasonic signals received from the remote controller 120 and calculates R and $\theta$ using the first distance information, the second distance information, and third distance information corresponding to preset L. Once R and $\theta$ are obtained, the two-dimensional location of the remote controller 120 with respect to the digital TV 150 can be estimated.

Figure 2:
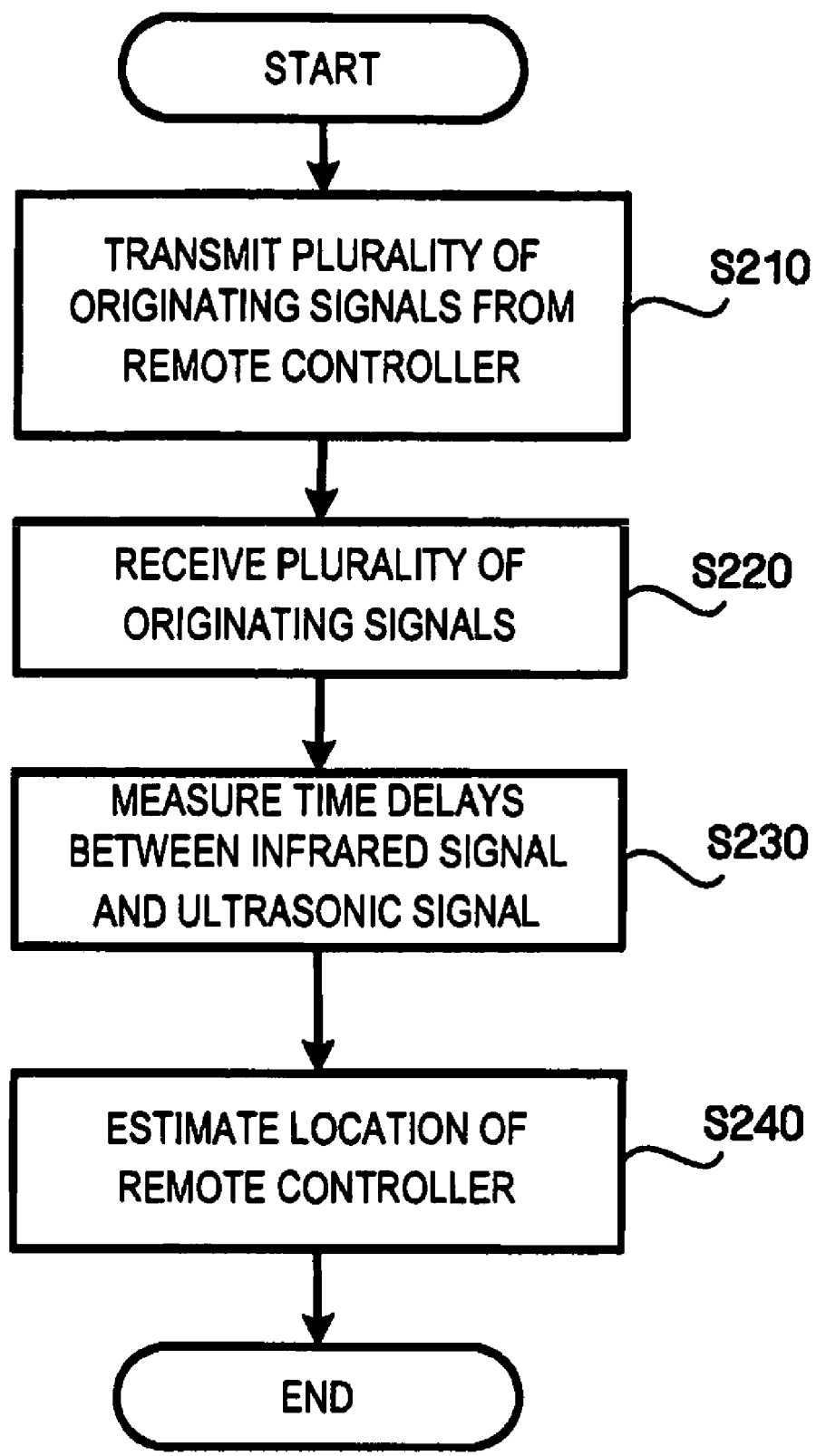
FIG. 2 is a flowchart illustrating a method for estimating the location of a remote controller according to an exemplary embodiment of the present invention.

In FIG. 2 it is illustrated in a general way a method for estimating the location of a remote controller according to an exemplary embodiment of the present invention.

First, a plurality of signals is transmitted from the remote controller 120 in step S210. The signals include infrared signals and ultrasonic signals. The signals generated and transmitted from the remote controller 120, including infrared signals and ultrasonic signals, will be referred to as originating signals. It is preferable that an ultrasonic signal be transmitted after transmission of an infrared signal, and the number of times the originating signals are transmitted may be preset in the remote controller 120.

The digital TV 150 receives the plurality of originating signals transmitted from the remote controller 120 in step S220. The digital TV 150 first receives an infrared signal through the infrared receiving sensor 152 and then receives ultrasonic signals through the first ultrasonic wave receiving sensor 154 and the second ultrasonic wave receiving sensor 156. The receipt time of the ultrasonic signal in the first ultrasonic wave receiving sensor 154 or the second ultrasonic wave receiving sensor 156 may change with the location of the remote controller 120. Since the propagation speed of an infrared signal in air is $3*10^8$ m/s and is faster than the propagation speed of an ultrasonic wave in air, i.e., 340 m/s, it is assumed that the propagation time of the infrared signal is negligible and the receiving and transmission of the infrared signal occur at the same time in the present invention.

Upon receiving the infrared signal and the ultrasonic signals included in the originating signals through the infrared receiving sensor 152, the first ultrasonic wave receiving sensor 154, and the second ultrasonic wave receiving sensor 156, the digital TV 150 measures time delays between the received infrared signal and ultrasonic signals in step S230. In other words, even when the ultrasonic signals are transmitted from the remote controller 120 immediately after the infrared signal, time delays between the received infrared signal and ultrasonic signals occur in the digital TV 150 due to a distance between the remote controller 120 and the digital TV 150. In addition, since the receipt time of the ultrasonic signal by the first ultrasonic wave receiving sensor 154 may be different from that of the ultrasonic signal by the second ultrasonic wave receiving sensor 156 according to the location of the remote controller 120, a time delay between the infrared signal and the ultrasonic signal received by the first ultrasonic wave receiving sensor 154 (hereinafter, referred to as a first time delay) is different from that between the infrared signal and the ultrasonic signal received by the second ultrasonic wave receiving sensor 156 (hereinafter, referred to as a second time delay).

After measuring the time delays, the location of the remote controller 120 is estimated in step S240. In other words, L1 is obtained using the first time delay, L2 is obtained using the second time delay, and R and $\theta$ are obtained using L1, L2, and the preset L.

Figure 3:
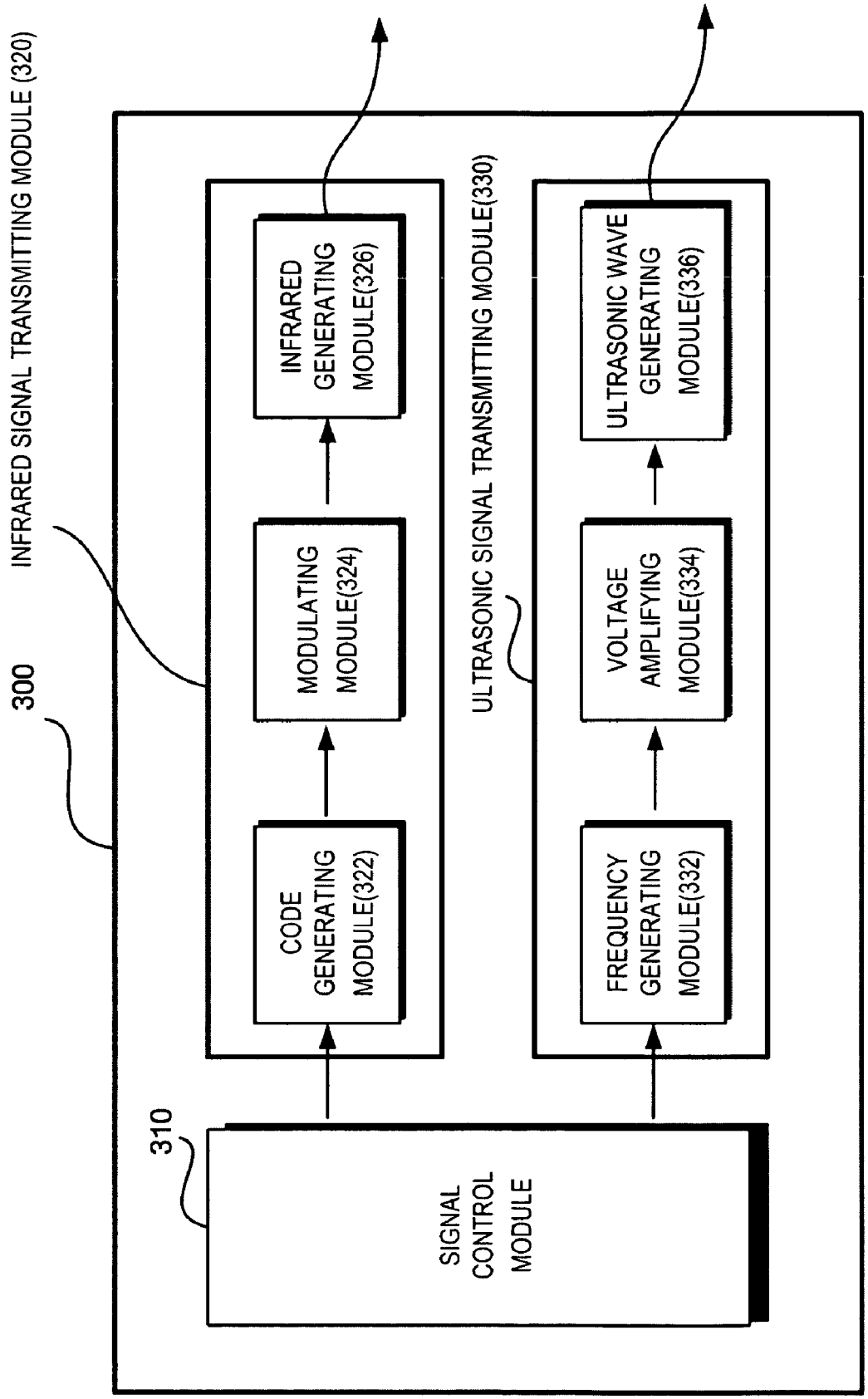
FIG. 3 is a block diagram of a remote controller according to an exemplary embodiment of the present invention.

FIG. 3 is a block diagram of a remote controller according to an exemplary embodiment of the present invention. A remote controller 300 includes an infrared signal transmitting module 320 that transmits infrared signals, an ultrasonic signal transmitting module 330 that transmits ultrasonic signals, and a signal control module 310 that controls and transmits a plurality of signals including infrared signals and ultrasonic signals.

Meanwhile, the term 'module', as used in an exemplary embodiment of the present invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

The ultrasonic signal transmitting module 330 includes a frequency generating module 332 that generates a preset frequency according to a signal received from the signal control module 310, a voltage amplifying module 334 that amplifies the ultrasonic signal, and an ultrasonic wave generating module 336 that generates the amplified ultrasonic signal. The ultrasonic wave generating module 336 may also be referred to as an ultrasonic signal generating module.

The infrared signal transmitting module 320 includes a code generating module 332 that generates an infrared signal recognition code according to a signal received from the signal control module 310, a modulating module 324 that modulates the generated infrared signal recognition code, and an infrared generating module 326 that generates the modulated infrared signal code. The infrared generating module 326 may also be referred to as an infrared signal generating module.

The signal control module 310 controls the infrared signal transmitting module 320 to transmit an infrared signal according to a predetermined signal input from a user and controls the ultrasonic signal transmitting module 330 to transmit an ultrasonic signal after the infrared signal is transmitted. At this time, it is preferable that the ultrasonic signal be transmitted immediately after the infrared signal.

Figure 5:
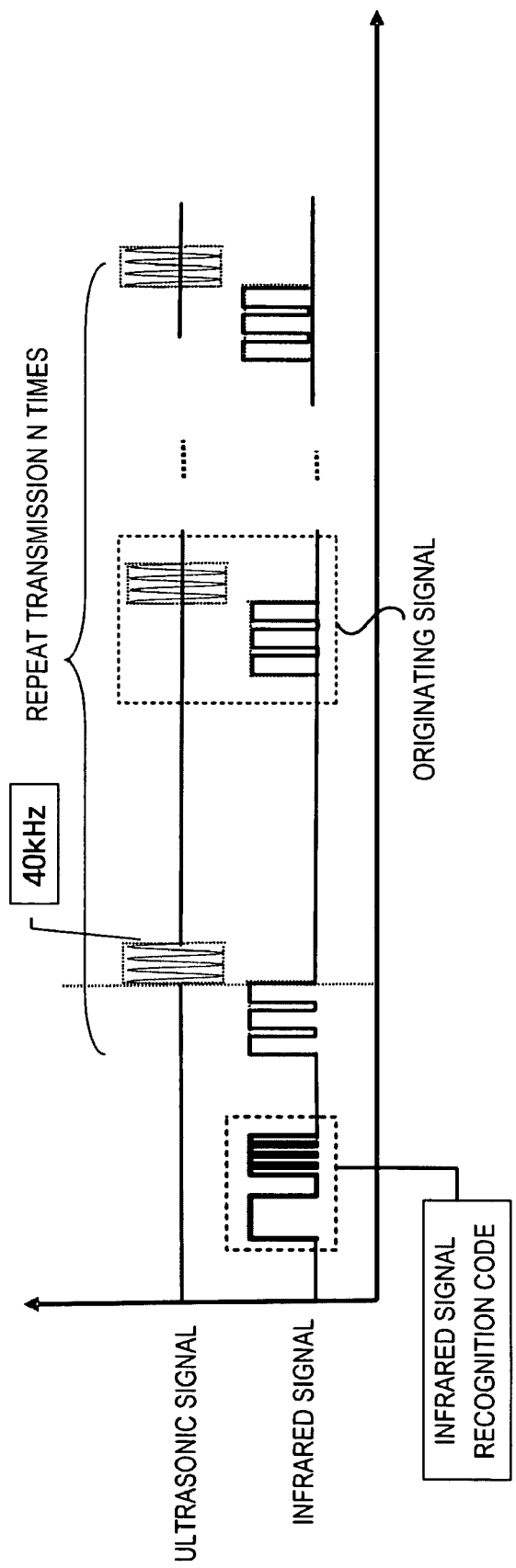
FIG. 5 illustrates waveforms of an infrared signal and an ultrasonic signal transmitted from a remote controller according to an exemplary embodiment of the present invention.

Examples of signals generated from the infrared signal transmitting module 320 and the ultrasonic signal transmitting module 330 of the remote controller 300 are illustrated in FIG. 5.

After the infrared signal recognition code is generated and transmitted by the code generating module 322, a plurality of originating signals is transmitted. Here, it is assumed that N originating signals are transmitted. In other words, the remote controller 300 generates the N originating signals at predetermined intervals after transmitting the infrared signal recognition code.

The infrared signal and the ultrasonic signal included in the originating signals are not generated simultaneously, and the ultrasonic signal is transmitted immediately after the infrared signal is transmitted as shown in FIG. 5. It is preferable that the frequency of the ultrasonic signal be 40 KHz.

An infrared signal included in a single generated signal includes a plurality of pulse groups, a detailed description of which will be given later.

Figure 4:
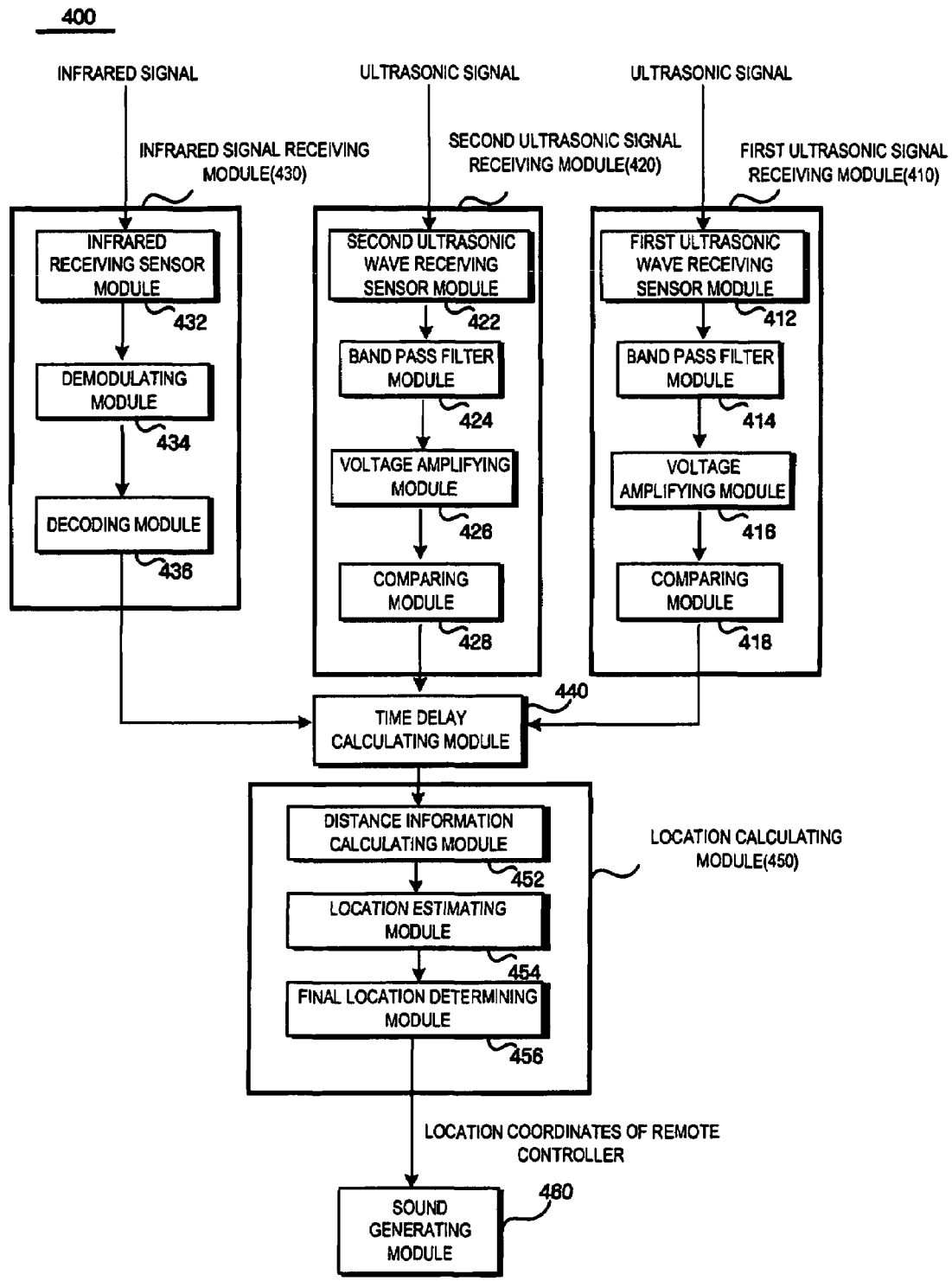
FIG. 4 is a block diagram of a receiver according to an exemplary embodiment of the present invention.

FIG. 4 is a block diagram of a receiver 400 according to an exemplary embodiment of the present invention. The receiver 400 includes an infrared signal receiving module 430, a first ultrasonic signal receiving module 410, a second ultrasonic signal receiving module 420, a time delay calculating module 440, a location calculating module 450, and a sound generating module 460. The infrared signal receiving module 430 receives an infrared signal from the remote controller 300 that transmits a plurality of signals including infrared signals and ultrasonic signals. The first ultrasonic signal receiving module 410 receives an ultrasonic signal. The second ultrasonic signal receiving module 420 is placed at the distance L from the first ultrasonic signal receiving module 410 and receives an ultrasonic signal. The time delay calculating module 440 measures time delays using the received infrared signal and received ultrasonic signals. The location calculating module 450 calculates R and θ using the measured time delays. The sound generating module 460 generates sound such that a sweet spot is generated at location coordinates of the remote controller 300 calculated by the location calculating module 450.

The infrared signal receiving module 430 includes an infrared receiving sensor module 432, a demodulating module 434, and a decoding module 436. The infrared receiving sensor module 432 senses and receives the infrared signal transmitted from the remote controller 300. The demodulating module 434 demodulates the received infrared signal. The decoding module 436 decodes the demodulated infrared signal.

The first ultrasonic signal receiving module 410 includes a first ultrasonic wave receiving sensor module 412, a band pass filter module 414, a voltage amplifying module 416, and a comparing module 418. The first ultrasonic wave receiving sensor module 412 senses and receives an ultrasonic signal transmitted from the remote controller 300. The band pass filter module 414 filters the received ultrasonic signal with respect to a predetermined frequency band. The voltage amplifying module 416 amplifies the filtered ultrasonic signal. The comparing module 418 processes the amplified ultrasonic signal into 0 or 1 based on a predetermined reference value.

The second ultrasonic signal receiving module includes a second ultrasonic wave receiving sensor module 422, a band pass filter module 424, a voltage amplifying module 426, and a comparing module 428. The structure of the second ultrasonic signal receiving module 420 is preferably the same as the structure of the first ultrasonic signal receiving module 410.

Figure 6:
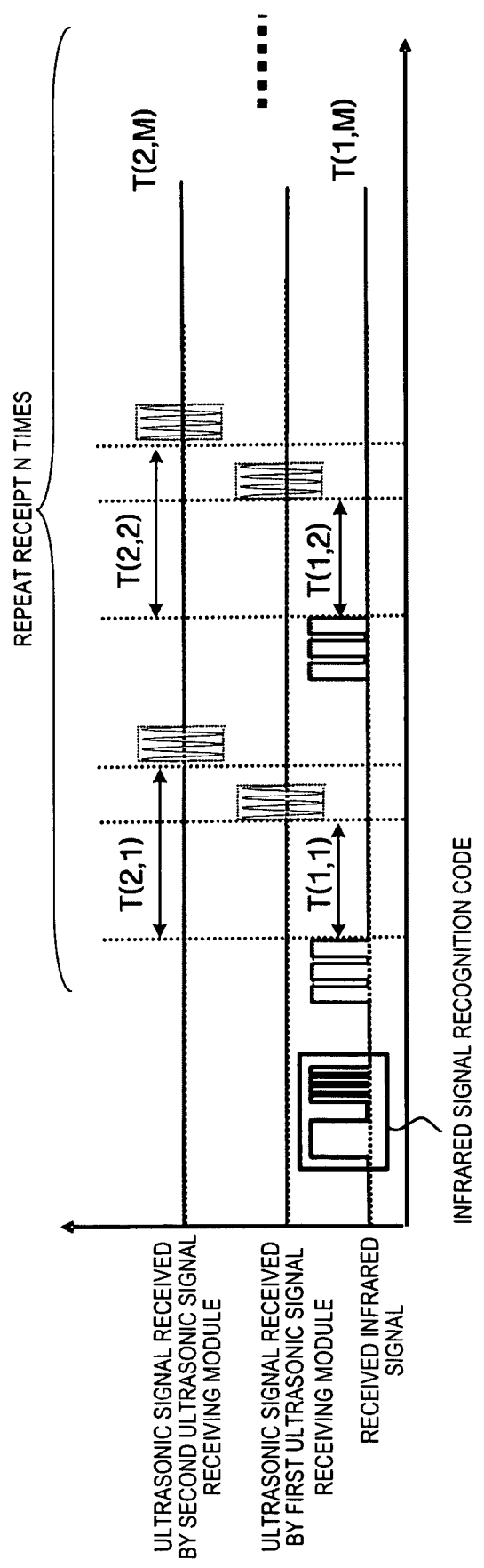
FIG. 6 illustrates waveforms of an infrared signal and ultrasonic signals received by a receiver according to an exemplary embodiment of the present invention.

The time delay calculating module 440 measures the origination time of the ultrasonic signal using the received infrared signal and measures the first time delay and the second time delay with respect to the measured origination time. Waveforms of the infrared signal and the ultrasonic signal received by the receiver 400 will be described in detail with reference to FIG. 6.

Once the infrared signal receiving module 430 of the receiver 400 receives the infrared signal recognition code from the remote controller 300, a signal corresponding to the infrared signal of the first originating signal is received and an ultrasonic signal is received by the first ultrasonic signal receiving module 410 after a time delay of T(1,1) (the first time delay). At this time, the first parameter of the time delay T indicates that the ultrasonic signal is received by the first ultrasonic signal receiving module 410 and the second parameter of the time delay T indicates that the received ultrasonic signal is a first received ultrasonic signal. The ultrasonic signal is received by the second ultrasonic signal receiving module 420 after the second time delay of T(2,1).

When an ultrasonic signal is generated immediately after an infrared signal from the remote controller 300, the termination time of the infrared signal is the same as the origination time of the ultrasonic signal. Thus, the first time delay and the second time delay can be obtained by determining the difference between the arrival times of the ultrasonic signal generated from the remote controller 300 at the receiver 400 and the termination time of the infrared signal.

Figure 7:
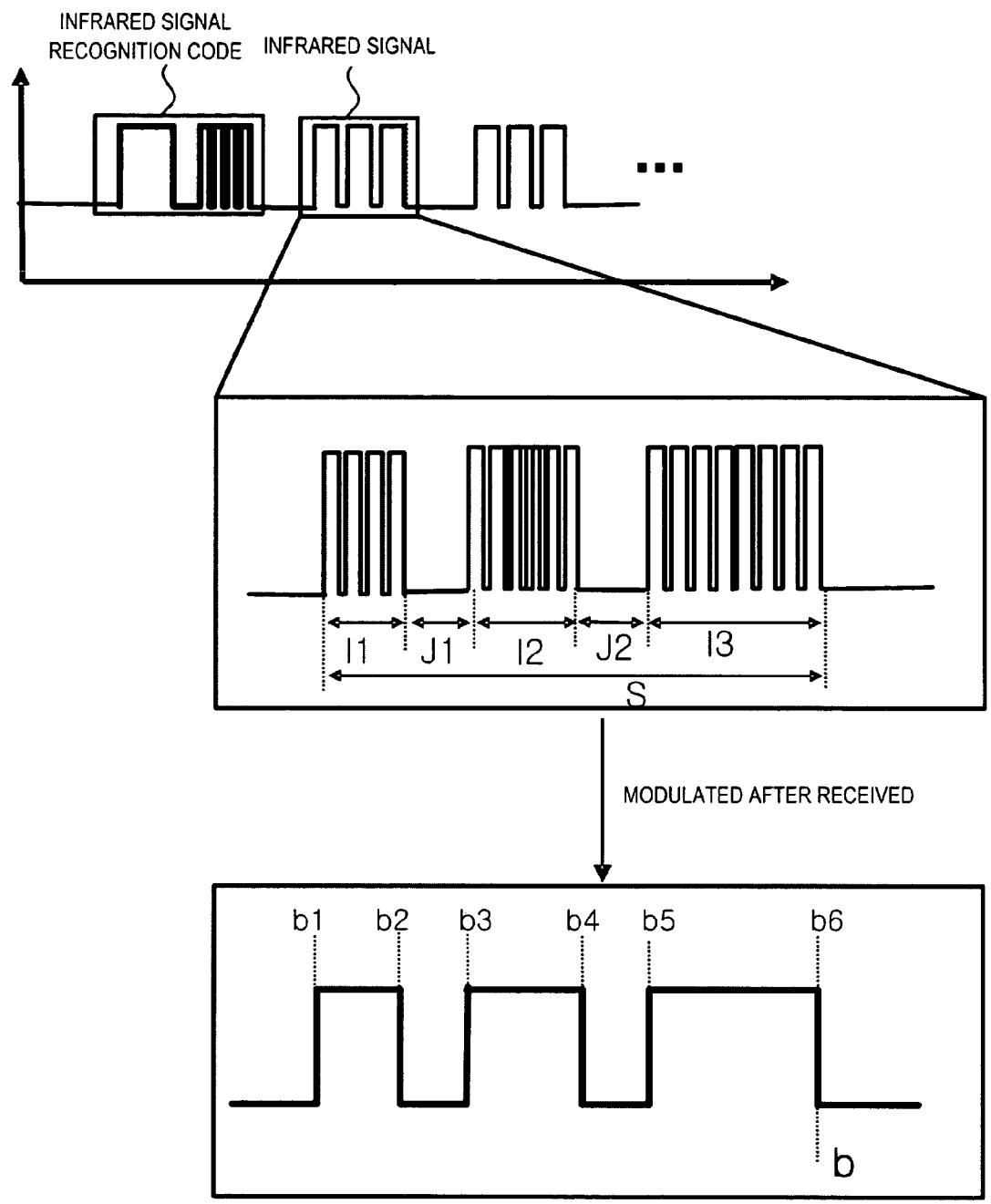
FIG. 7 is a view for explaining a method for obtaining the origination time of an ultrasonic signal using the termination time of the origination of an infrared signal.

FIG. 7 is a view for explaining a method for obtaining the origination time of an ultrasonic signal using the termination time of an infrared signal originating from the remote controller 300.

Referring to FIG. 7, an infrared signal generated from the remote controller 300 includes a plurality of pulse groups. In FIG. 7, one infrared signal includes three pulse groups in which the width of a first pulse group is I1, the width of a second pulse group is I2, the width of a third pulse group is I3, an interval between the first pulse group and the second pulse group is J1, an interval between the second pulse group and the third pulse group is J2, and the width of the infrared signal is S. In other words, when the remote controller 300 generates the infrared signal, the width S of the infrared signal is equal to I1+J1+I2+J2+I3. However, until the infrared signal arrives at the receiver 400, I1, J1, I2, J2, and I3 change due to external influences such as disturbance or noise in peripheral environments and the inherent characteristic of the infrared signal. Thus, the receiver 400 should check the waveform of the received infrared signal to recognize whether the received infrared signal is transmitted from the remote controller 300. In other words, the infrared signal receiving module 430 of the receiver 400 receives a predetermined infrared signal recognition code, searches for a waveform satisfying d*I1<t (the width of a waveform)<e*I1, and records the start and end of the found waveform as b1 and b2. After a time delay of c*J1, the infrared signal receiving module 430 searches for a waveform satisfying d*I2<t<e*I2 and records the start and end of the found waveform as b3 and b4. After a time delay of c*J2, the infrared signal receiving module 430 searches for a waveform satisfying d*I3<t<e*I3 and records the start and end of the found waveform as b5 and b6. At this time, each of d, e, and c is a variable for adding margins to the width of a pulse group and an interval between pulse groups and, for example, d=0.8, e=1.2, and c=0.5.

In this way, b1, b2, b3, b4, b5, and b6 are obtained and the origination time b of an ultrasonic signal can be obtained using b1, b2, b3, b4, b5, and b6. If the origination time b1 of an infrared signal is assumed to be 0, estimates of the origination time b for edges of each pulse can be expressed as X1=b1+S, X2=b2+S−I1, X3=b3+S−I1−J1, X4=b4+J2+I3, X5=b5+I3, and X6=b6. The origination time b can be more accurately obtained using a linear sum of the estimates as in Equation (1) than using each of the estimates of the edges.

$$\hat{b} = \sum_{n=1}^{6} \alpha_n x_n = a^T x, \quad (1)$$

where $x=[x_1, \ldots x_6]$, $\alpha=[\alpha_1, \ldots, \alpha_6]^T$, and $\alpha_n$ is a coefficient for a linear sum and does not merely mean a weight value. (Although n is from 1 to 6 in this example, n can be any natural number such as 1, 2, 3, 4, 5, 6, 7, . . . . ) Here, in order for $\hat{b}$ to be closer to the origination time b, it is preferable that the average of $\hat{b}$ be $E(\hat{b})=b$ and the dispersion of $\hat{b}$, i.e., $\text{var}(\hat{b})$, be equal to $E[\{\hat{b}-E(\hat{b})\}^2]$. In other words, to obtain the optimal estimate of b, α satisfying the foregoing condition should be obtained.

$$\text{var}(\hat{b}) = E[\{\alpha^T x - \alpha^T E(x)\}^2]$$
$$= E[\alpha^T (x - E(x))(x - E(x))^T \alpha]$$
$$= \alpha^T C \alpha$$

where C indicates a covariance matrix of x and C is equal to $C=(x-E(x))(x-E(x))^T$.

When the origination time b1 of the infrared signal is assumed to be 0, b=S, and $E(\hat{b})=b$, then $E(\hat{b})=S$.

When it is assumed that $E(X_n)=s_n*S$, a problem to be solved is to obtain α minimizing $\alpha^T C \alpha$ under the condition $$\sum_{n=1}^{6} s_n x_n = 1.$$

Here, $s_n$ indicates a ratio of S, and an average $E(X_n)$ of $X_n$ can be approximately obtained through experiments. Thus, $s_n$ can also be obtained through experiments. The optimal solution $\alpha_{opt}$ for this problem can be obtained using a Lagrangian multiplier and $$\alpha_{opt} = \frac{C^{-1} s}{s^T C^{-1} s}.$$

At this time, an estimate of b is $$\hat{b} = \frac{s^T C^{-1} x}{s^T C^{-1} s}$$

and $s=[s1, \ldots, s6]^T$.

A previously obtained $\alpha^{opt}$ may be selected. According to another exemplary embodiment of the present invention, when the same weight value is applied to all edges, α=[1, 1, 1, 1, 1, 1]/6. When only rising edges are used, α=[1, 0, 1, 0, 1, 0]/3. When only falling edges are used, α=[0, 1, 0, 1, 0, 1]/3.

Figure 8A:
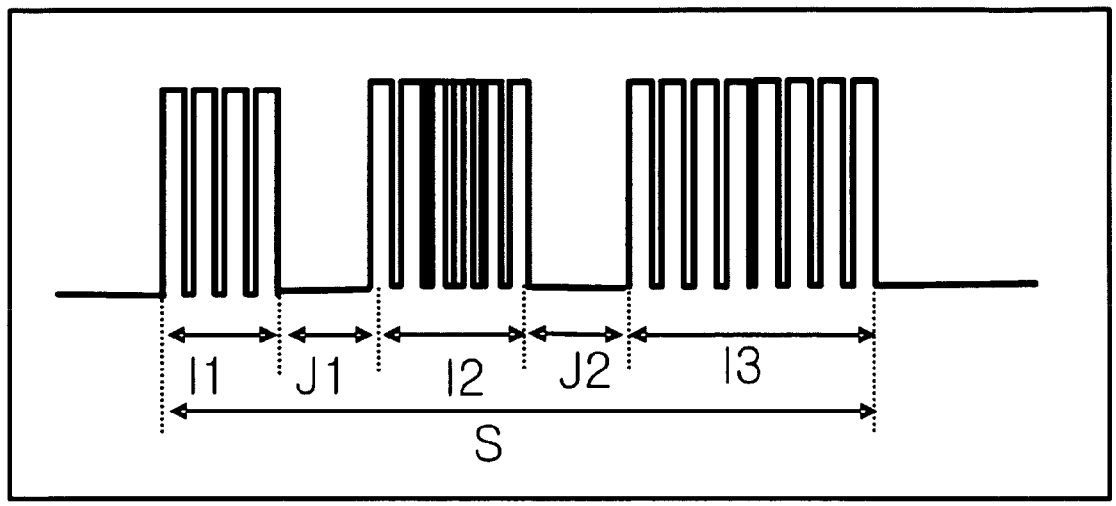
FIGS. 8A and 8B illustrate forms of pulse groups according to an exemplary embodiment of the present invention.
Figure 8B:
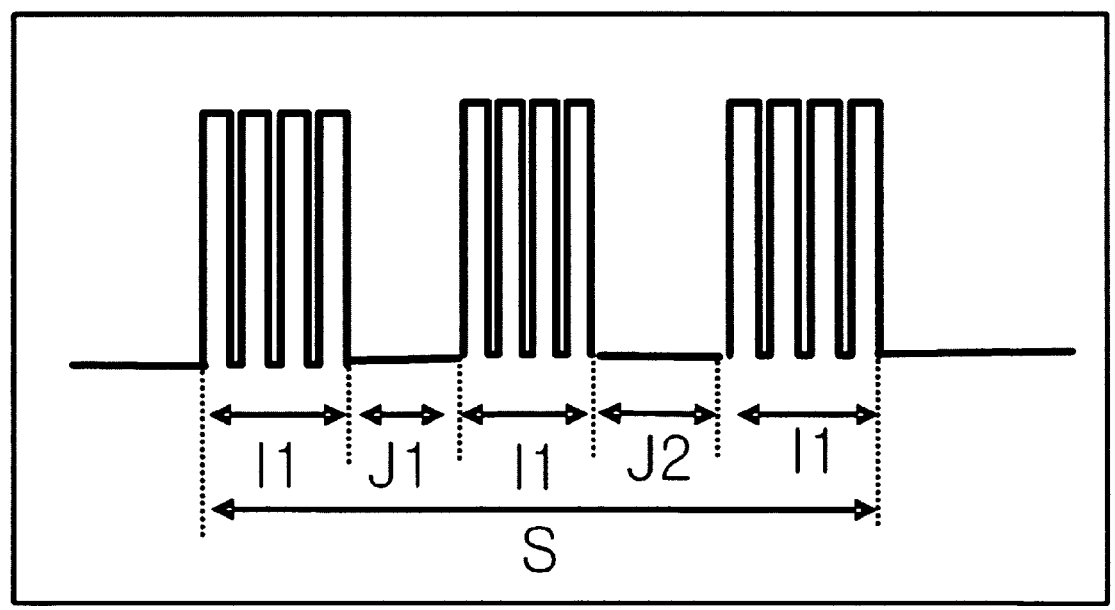

A plurality of pulse groups included in an infrared signal may or may not have equal widths as shown in FIGS. 8A and 8B. In FIG. 8A, to distinguish the pulse groups, the pulse groups have different widths. In FIG. 8B, the pulse groups have equal widths.

Figure 9:
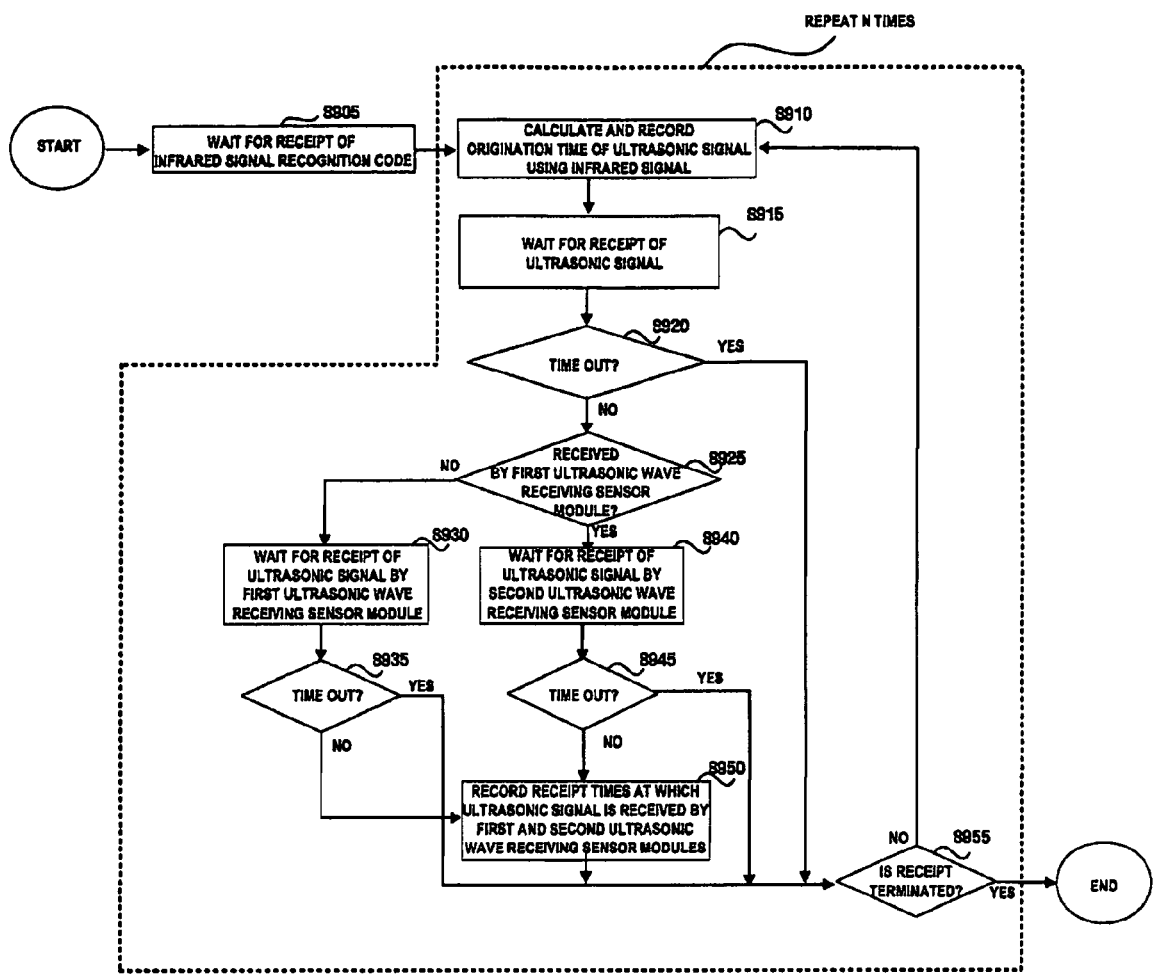
FIG. 9 is a flowchart illustrating a method for calculating the receipt time of an ultrasonic signal according to an exemplary embodiment of the present invention.

FIG. 9 is a flowchart illustrating a method for calculating the receipt time of an ultrasonic signal by the first ultrasonic signal receiving module 410 or the second ultrasonic signal receiving module 420 after the time delay calculating module 440 obtains the origination time of the ultrasonic signal using the termination time of an infrared signal.

In other words, the receiver 400 calculates and records the origination time of an ultrasonic signal using the infrared signal upon receiving the infrared signal recognition code in steps S905 and S910. The receiver 400 waits for the first ultrasonic signal receiving module 410 or the second ultrasonic signal receiving module 420 to receive an ultrasonic signal in step S915. If the ultrasonic signal is not received within a predetermined amount of time in step S920, it is checked whether the receipt of originating signals is terminated in step S955. If the ultrasonic signal is received within the predetermined amount of time and the received ultrasonic signal is received by the first ultrasonic signal sensor module 412 in step S920, the receiver 400 waits for the second ultrasonic signal receiving sensor module 422 to receive the ultrasonic signal in steps S925 and S940. At this time, if the ultrasonic signal is not received by the second ultrasonic wave receiving sensor module 422 within the predetermined amount of time in step S945, it is checked whether the receipt of originating signals is terminated in step S955. When the ultrasonic signal is received by the second ultrasonic signal receiving sensor module 422 within the predetermined amount of time in step S945, the receipt time of the ultrasonic signal by the first ultrasonic signal receiving sensor module 412 and the receipt time of the ultrasonic signal by the second ultrasonic signal receiving sensor module 422 are recorded in step S950, and it is checked whether the receipt of originating signals is terminated in step S955.

If the ultrasonic signal is not received by the first ultrasonic wave receiving sensor module 412 in step S925, it means that the ultrasonic signal is received by the second ultrasonic wave receiving sensor module 422. Thus, the receiver 400 waits for the first ultrasonic wave receiving sensor module 412 to receive the ultrasonic signal in step S930. At this time, if the ultrasonic signal is not received by the first ultrasonic wave receiving sensor module 412 within the predetermined amount of time in step S935, it is checked whether the receipt of originating signals is terminated in step S955. If the ultrasonic signal is received by the first ultrasonic signal sensor module 412 within the predetermined amount of time in step S935, the receipt time of the ultrasonic signal by the first ultrasonic wave receiving sensor module 412 and the receipt time of the ultrasonic signal by the second ultrasonic wave receiving sensor module 422 are recorded in step S950 and it is checked whether the receipt of originating signals is terminated in step S955.

When N originating signals are transmitted from the remote controller 300, it is determined whether the origination time and receipt time of the ultrasonic signal are checked N times for a single originating signal. If the checks are performed N times, a process illustrated in FIG. 9 is terminated.

The location calculating module 450 includes a distance information calculating module 452, a location estimating module 454, and a final location determining module 456 (FIG. 4). The distance information calculating module 452 calculates L1 and L2 illustrated in FIG. 1 using the first time delay and the second time delay for each originating signal, calculated by the time delay calculating module 440. A detailed operation of the location calculating module 450 will be described with reference to FIG. 10.

Figure 10:
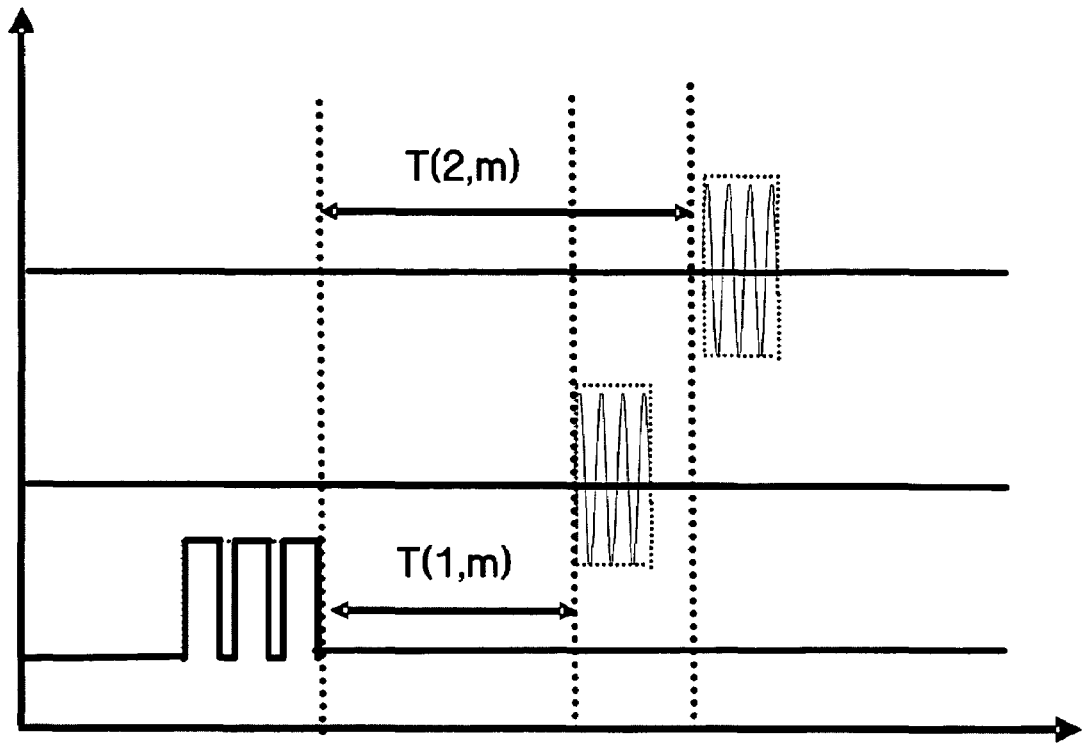
FIG. 10 illustrates a first time delay and a second time delay according to an exemplary embodiment of the present invention.

In the case of an $m^{th}$ originating signal transmitted from the remote controller 300, a time delay T(1,m) of the first ultrasonic signal receiving module 410 and a time delay T(2,m) of the second ultrasonic signal receiving module 410 with respect to the origination time of an ultrasonic signal are shown in FIG. 10. It is assumed that T(1,m) and T(2,m) are obtained using the foregoing method.

At this time, in the case of the $m^{th}$ originating signal, a distance L(1,m) between the remote controller 300 and the first ultrasonic signal receiving module 410 and a distance L(2,m) between the remote controller 300 and the second ultrasonic signal receiving module 420 can be expressed as follows:

$$L(1,m) = v(t)(m/s) * T(1,m) \quad (2)$$

$$L(2,m) = v(t)(m/s) * T(2,m) \quad (3)$$

Figure 11:
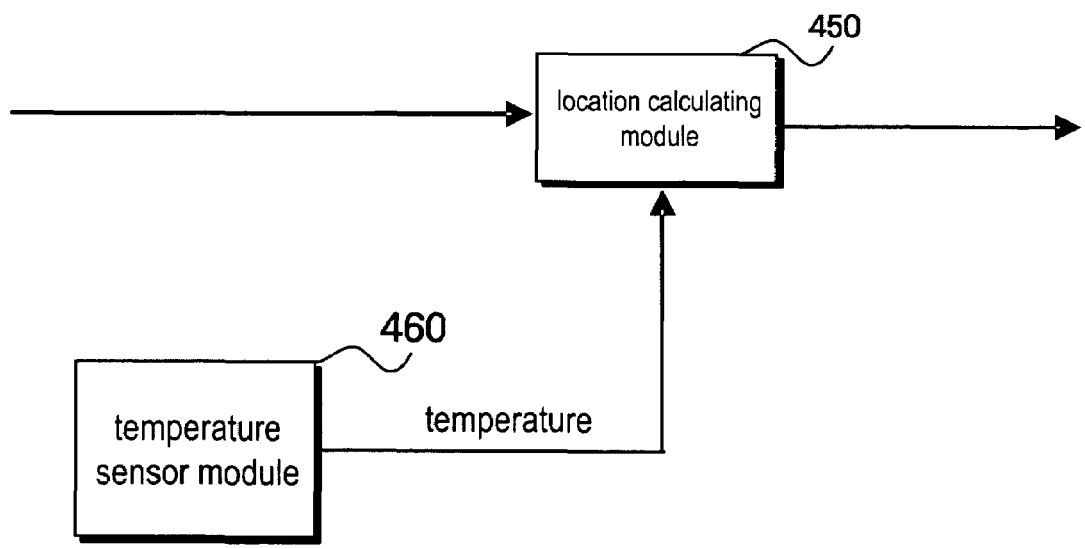
FIG. 11 is a block diagram of a receiver including a temperature sensor module according to an exemplary embodiment of the present invention.

In Equations (2) and (3), v(t) indicates the speed of a sound wave when the temperature of air is t° C. and can be expressed as v(t)=331+0.6t(m/s). As illustrated in FIG. 11, the receiver 400 includes the temperature sensor module 460 to transmit a measured temperature to the distance information calculating module 452 of the location calculating module 450. The distance information calculating module 452 can obtain v(t) using received temperature information. If the receiver 400 does not include the temperature sensor module 460, L(1,m) and L(2,m) can be obtained using v(t) as a constant.

Figure 12:
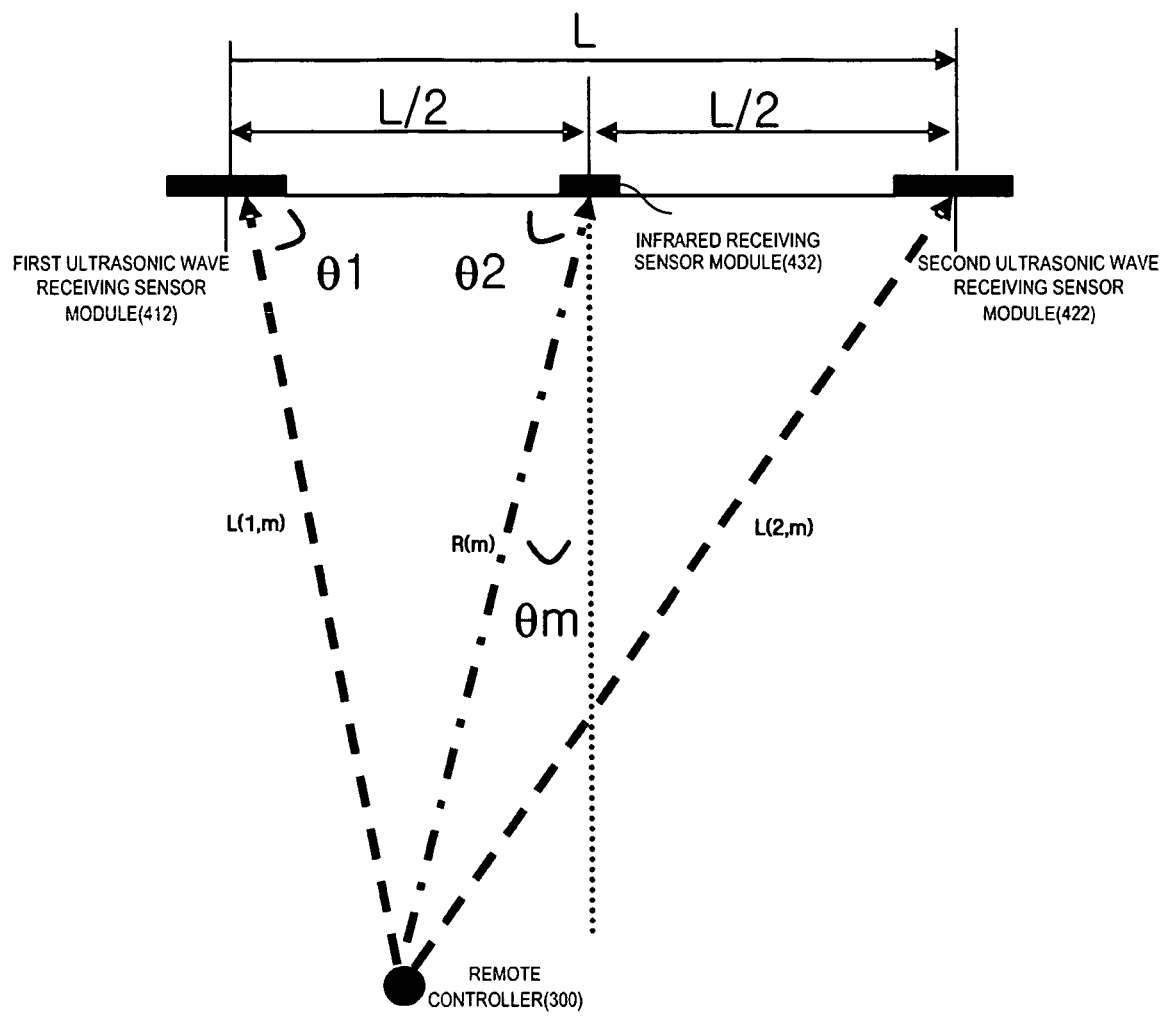
FIG. 12 illustrates parameters used to calculate the location of a remote controller according to an exemplary embodiment of the present invention.

The location estimating module 454 estimates the location of the remote controller 300 using L(1,m) obtained using Equation (2), L(2,m) obtained using Equation (3), and the preset L. To this end, the location estimating module 454 may use the law of cosine as follows, and parameters are illustrated in FIG. 12.

$$\cos\theta_1 = \frac{L^2 + L_{1,m}^2 - L_{2,m}^2}{2 * L_{1,m} * L}$$

$$R_m = \sqrt{L_{1,m}^2 + (L/2)^2 - 2*(L/2)*L_{1,m}*\cos\theta_1}$$

$$= \sqrt{\frac{2(L_{1,m}^2 + L_{2,m}^2) - L^2}{4}}$$

$$\cos\theta_2 = \frac{(L/2)^2 + R_m^2 - L_{1,m}^2}{2*R_m*(L/2)} = \frac{L^2/4 + R_m^2 - L_{1,m}^2}{LR_m}$$

$$\theta_2 = \cos^{-1}\left(\frac{L^2/4 + R_m^2 - L_{1,m}^2}{LR_m}\right)$$

$$\theta_m = \cos^{-1}\left(\frac{L^2/4 + R_m^2 - L_{1,m}^2}{LR_m}\right) - \frac{\pi}{2}$$

When the remote controller 300 transmits N originating signals, the receiver 400 receives M signal sets corresponding to the N originating signals. At this time, each of the signal sets includes one infrared signal and two ultrasonic signals and M is smaller than or equal to N. Since infrared signals or ultrasonic signals transmitted from the remote controller 300 may be lost while being transmitted to the receiver 400, the number of signal sets actually received by the receiver 400 may be smaller than N.

Once the receiver 400 receives the M signal sets, the location estimating module 454 estimates M locations of the remote controller 300 and the final location determining module 456 determines a final location of the remote controller 300 using the estimated M locations of the remote controller 300.

Figure 13:
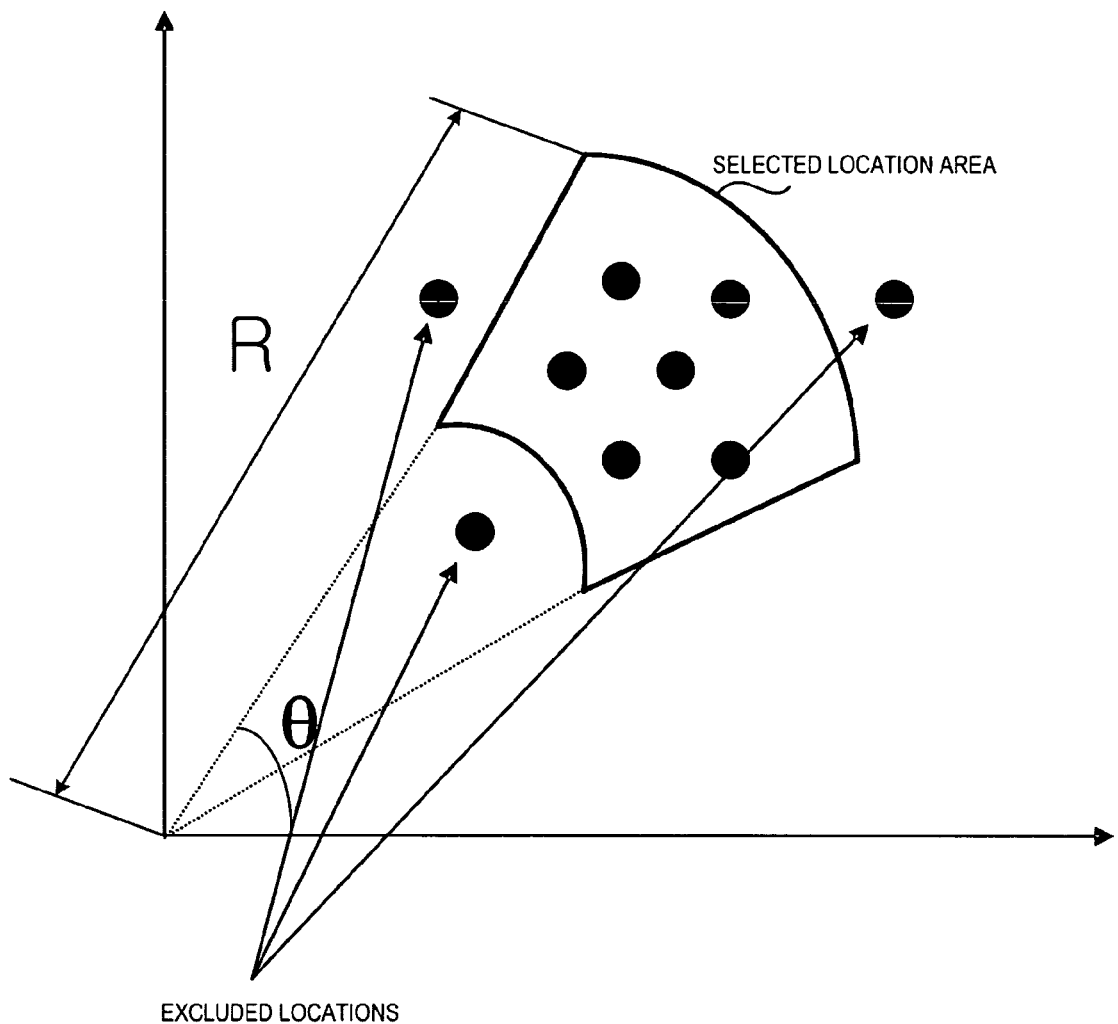
FIG. 13 is a view for explaining selection of location coordinates except for coordinates having abnormal values according to an exemplary embodiment of the present invention.
Figure 14:
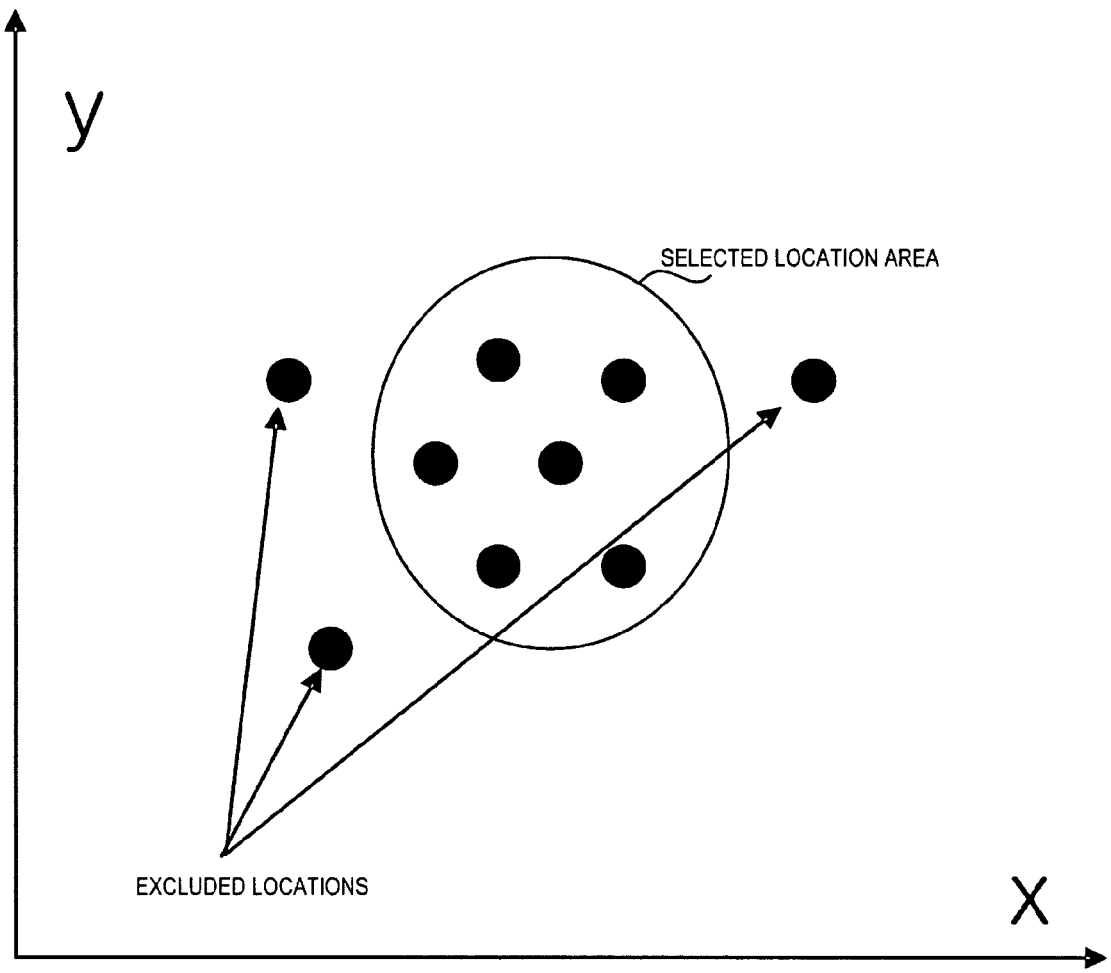
FIG. 14 is another view for explaining selection of location coordinates except for coordinates having abnormal values according to an exemplary embodiment of the present invention.

At this time, to determine the final location of the remote controller 300, the method illustrated in FIG. 13 or FIG. 14 may be used.

In FIG. 13, abnormally received M location coordinates among originating signals transmitted N times from the remote controller 300 are expressed on a two-dimensional coordinate plane and an average of the remaining coordinates among R and θ values, except for abnormal values is obtained, thereby obtaining a final location (R, θ) of the remote controller 300. A process of determining the final location of the remote controller 300 using the method of FIG. 13 may be performed by the final position determining module 456 of the location calculating module 450.

In FIG. 14, the final location of the remote controller 300 can be determined using the first time delay and the second time delay, and such a determination of the final location can be performed by the time delay calculating module 440.

More specifically, an X axis indicates a difference between the first time delay and the second time delay and a Y axis indicates a larger value between the first time delay and the second time delay. At this time, the time delay calculating module 440 calculates an average of first time delays and second time delays corresponding to the remaining coordinates among values corresponding to X or Y, except for abnormal values. The distance information calculating module 452 of the location calculating module 450 calculates L(1,m) and L(2,m) illustrated in FIG. 12 using the foregoing method and the location estimating module 454 estimates the location of the remote controller 300 using L(1,m) and L(2,m). Thus, according to the method illustrated in FIG. 14, the final location determining module 456 may not perform a separate operation.

Figure 15A:
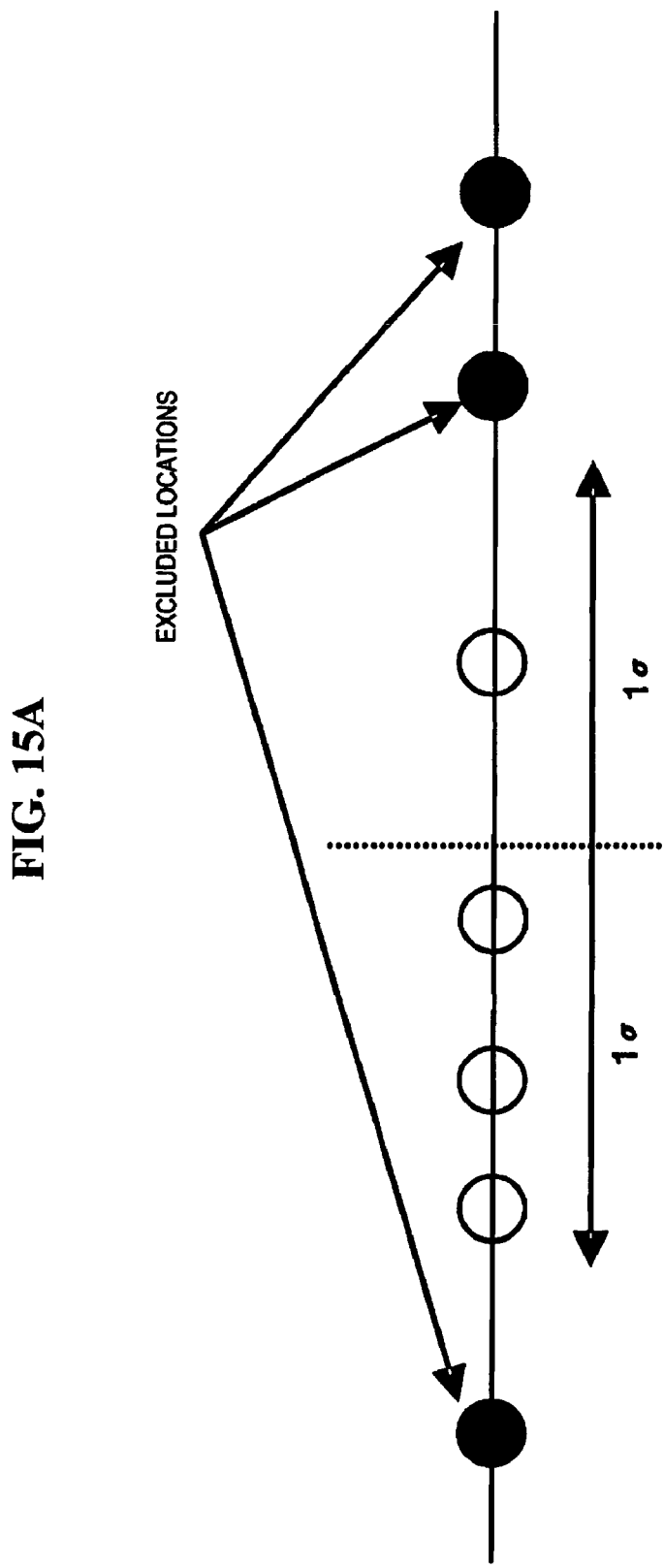
FIGS. 15A and 15B are views for explaining a method for determining abnormal values according to an exemplary embodiment of the present invention.
Figure 15B:
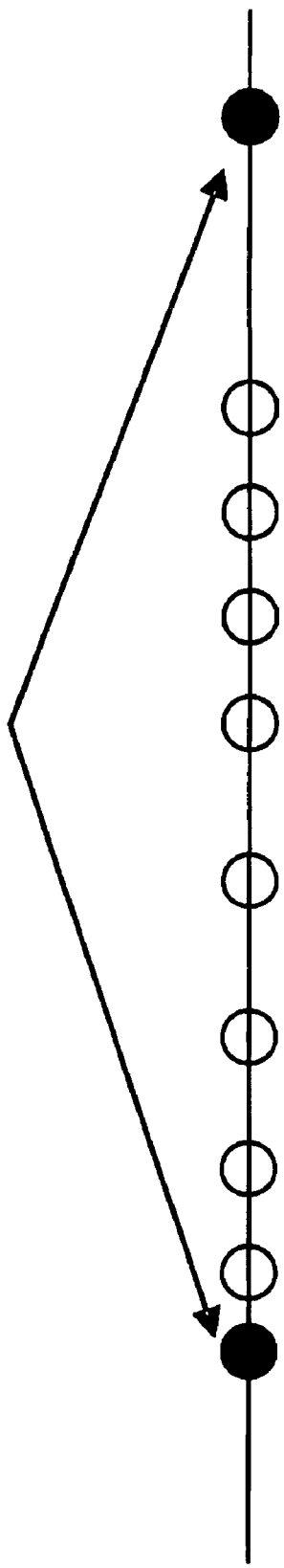

A method for determining abnormal values to determine the final location of the remote controller 300 as in FIG. 13 or FIG. 14 is illustrated in FIGS. 15A and 15B. In FIG. 15A, after an average and a dispersion of corresponding values are obtained, values deviating from the average by a predetermined dispersion are determined to be abnormal values. In FIG. 15B, corresponding values are determined and predetermined values at both ends (e.g., values of 20% within a range from both ends) are excluded.

Once the final location of the remote controller 300 is determined by the final location determining module 456 included in the location calculating module 450, the sound generating module 460 adjusts the direction of speakers to generate a sweet spot in the final location or tunes various components capable of adjusting a location where the sweet spot is generated.

According to the present invention, the location of a remote controller can be accurately estimated according to a user's location for more efficient reproduction of surround sound.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., ROM, floppy disks, hard disks, etc.), optical recording media (e.g., CD-ROMs, or DVDs), random access memory media, and storage/transmission media such as carrier waves. Examples of storage/transmission media may include wired or wireless transmission (such as transmission through the Internet). The medium may also be a distributed network, so that the computer readable code/instructions is stored/transferred and executed in a distributed fashion. The computer readable code/instructions may be executed by one or more processors.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method for estimating a final location of a remote controller using ultrasonic waves and for generating sound at a sweet spot, the method comprising:
   receiving a plurality of signals transmitted from the remote controller;
   measuring time delays between an infrared signal and an ultrasonic signal included in each of the received signals;
   estimating locations of the remote controller with respect to each of the received signals using the measured time delays;
   estimating the final location of the remote controller based on the estimated locations of the remote controller; and
   generating sound such that the sweet spot is generated at the final location of the remote controller.

2. The method of claim 1, wherein the ultrasonic signals are transmitted from the remote controller after the infrared signal is transmitted.

3. The method of claim 1, wherein the infrared signal includes a plurality of pulse groups.

4. The method of claim 1, wherein the measuring of the time delays comprises:
   measuring the origination time of the ultrasonic signals using the infrared signal; and
   measuring a first time delay between the measured origination time of the ultrasonic signal and the receipt time of the ultrasonic signal by a first ultrasonic wave receiving sensor and a second time delay between the measured origination time of the ultrasonic signal and the receipt time of the ultrasonic signal by a second ultrasonic wave receiving sensor.

5. The method of claim 4, where the estimating of the locations of the remote controller comprises:
   calculating first distance information between the remote controller and the first ultrasonic receiving sensor using the first time delay and calculating second distance information between the remote controller and the second ultrasonic receiving sensor using the second time delay; and
   estimating the locations of the remote controller with respect to each of the received originating signals using the first distance information, the second distance information, and third distance information between the first ultrasonic receiving sensor and the second ultrasonic receiving sensor.

6. The method of claim 5, wherein in the calculating of the first distance information, the first distance information and the second distance information are calculated using the speed of air adjusted according to a change in temperature.

7. The method of claim 1, wherein the estimating of the final location of the remote controller comprises:
   selecting the remaining locations of the remote controller among the estimated locations of the remote controller, except for locations having abnormal coordinates; and
   calculating an average of the selected locations and estimating the calculated average as the final location of the remote controller.

8. A method for estimating a location of a remote controller using ultrasonic waves and for generating sound at a sweet spot, the method comprising:
   receiving a plurality of signals transmitted from the remote controller;
   measuring time delays between an infrared signal and an ultrasonic signal included in each of the received signals;
   calculating an average of time delays measured for the received signals;
   estimating the location of the remote controller using the calculated averages; and
   generating sound such that the sweet spot is generated at the location of the remote controller.

9. The method of claim 8, wherein the ultrasonic signals are transmitted from the remote controller after the infrared signal is transmitted.

10. The method of claim 8, wherein the infrared signal includes a plurality of pulse groups.

11. The method of claim 8, wherein the measuring of the time delays comprises:

measuring the origination time of the ultrasonic signals using the infrared signal; and measuring a first time delay between the measured origination time of the ultrasonic signal and the receipt time of the ultrasonic signal by a first ultrasonic wave receiving sensor and a second time delay between the measured origination time of the ultrasonic signal and the receipt time of the ultrasonic signal by a second ultrasonic wave receiving sensor.

12. The method of claim 11, wherein the calculating of an average of time delays measured for the received signals comprises:

(c-1) checking whether or not the first time delay or the second time delay has an abnormal value; and (c-2) calculating a first average time delay of first time delays and a second average time delay of second time delays with respect to originating signals except for the originating signals having abnormal values.

13. The method of claim 12, wherein the estimating of the location comprises:

calculating first distance information between the remote controller and the first ultrasonic receiving sensor using the first average time delay and calculating second distance information between the remote controller and the second ultrasonic receiving sensor using the second average time delay; and estimating the location of the remote controller with respect to each of the received originating signals using the first distance information, the second distance information, and third distance information between the first ultrasonic receiving sensor and the second ultrasonic receiving sensor.

14. The method of claim 13, wherein in the calculating of the first distance information, the first distance information and the second distance information are calculated using the speed of air adjusted according to a change in temperature.

15. A remote controller to interface with a receiver including a sound generating module, comprising:

an infrared signal transmitting module which transmits infrared signals;

an ultrasonic signal transmitting module which transmits ultrasonic signals;

an originating signal control module which controls transmission of the infrared signals and the ultrasonic signals, wherein the receiver determines the location of the remote controller based on the receipt of the infrared signals and ultrasonic signals, and wherein the sound generating module generates sound such that a sweet spot is generated at the location of the remote controller.

16. The remote controller of claim 15, wherein the infrared signals include a plurality of pulse groups.

17. The remote controller of claim 15, wherein the ultrasonic signals are transmitted from the remote controller after the infrared signals.

18. A receiver comprising:

an infrared signal receiving module which receives an infrared signal from a remote controller that transmits a plurality of signals including infrared signals and ultrasonic signals;

a first ultrasonic signal receiving module which receives an ultrasonic signal;

a second ultrasonic signal receiving module which is separated from the first ultrasonic signal receiving module by a predetermined distance and receives the ultrasonic signal;

a time delay calculating module which measures an origination time of the ultrasonic signal using the infrared signal and measures a first time delay between the measured origination time of the ultrasonic signal and the receipt time of the ultrasonic signal by a first ultrasonic wave receiving sensor and a second time delay between the measured origination time of the ultrasonic signal and a receipt time of the ultrasonic signal by a second ultrasonic wave receiving sensor;

a location calculating module which estimates the location of the remote controller with respect to each of the received signals transmitted by the remote controller using the measured time delays and estimates the final location of the remote controller based on the estimated locations of the remote controller; and a sound generating module which generates sound such that a sweet spot is generated at the final location of the remote controller.

19. The receiver of claim 18, wherein the ultrasonic signals are transmitted from the remote controller after the infrared signal is transmitted.

20. The receiver of claim 18, wherein the infrared signal includes a plurality of pulse groups.

21. The receiver of claim 18, wherein the location calculating module comprises:

a location information calculating module which calculates first distance information between the remote controller and the first ultrasonic receiving sensor using the first time delay and calculates second distance information between the remote controller and the second ultrasonic receiving sensor using the second time delay;

a location estimating module which estimates a location of the remote controller with respect to each of the received signals using the first distance information, the second distance information, and third distance information between the first ultrasonic receiving sensor and the second ultrasonic receiving sensor; and a final location determining module which estimates the final location of the remote controller using the estimated locations of the remote controller.

22. The receiver of claim 21, wherein the location calculating module further comprises a temperature sensor module which measures the temperature of air, and the distance information calculating module calculates distance information using the speed of air adjusted according to a change in the temperature of air measured by the temperature sensor module.

23. The receiver of claim 18, wherein the location calculating module selects the remaining locations of the remote controller among the estimated locations of the remote controller, except for locations having abnormal coordinates, calculates an average of the selected locations, and estimates the calculated average as the final location of the remote controller.

24. A receiver comprising:

an infrared signal receiving module which receives an infrared signal from a remote controller that transmits a plurality of signals including infrared signals and ultrasonic signals;

a first ultrasonic signal receiving module which receives an ultrasonic signal;

a second ultrasonic signal receiving module which is separated from the first ultrasonic signal receiving module by a predetermined distance and receives the ultrasonic signal;

a time delay calculating module which measures an origination time of the ultrasonic signal using the infrared signal, measures a first time delay between the measured origination time of the ultrasonic signal and a receipt time of the ultrasonic signal by a first ultrasonic wave receiving sensor and a second time delay between the measured origination time of the ultrasonic signal and a receipt time of the ultrasonic signal by a second ultrasonic wave receiving sensor, and calculates an average of the first time delays measured for the received signals and an average of the second time delays measured for the received signals;

a location calculating module which estimates the location of the remote controller using the calculated an average;

a sound generating module which provides sound such that a sweet spot is generated at the location of the remote controller.

25. The receiver of claim 24, wherein the ultrasonic signals are transmitted from the remote controller after the infrared signal is transmitted.

26. The receiver of claim 24, wherein the infrared signal includes a plurality of pulse groups.

27. The receiver of claim 24, wherein the time delay calculating module checks if the first time delay or the second time delay has an abnormal value and calculates a first average time delay of first time delays and a second average time delay of second time delays with respect to the remaining signals except for signals having abnormal values.

28. The receiver of claim 27, wherein the location calculating module comprises:
a distance information calculating module which calculates first distance information between the remote controller and the first ultrasonic receiving sensor using the first time delay and calculates second distance information between the remote controller and the second ultrasonic receiving sensor using the second time delay; and
a location estimating module which estimates the location of the remote controller with respect to each of the received signals using the first distance information, the second distance information, and third distance information between the first ultrasonic receiving sensor and the second ultrasonic receiving sensor.

29. The receiver of claim 28, wherein the location calculating module further comprises a temperature sensor module which measures the temperature of air, and the distance information calculating module calculates distance information using the speed of air adjusted according to a change in the temperature of air measured by the temperature sensor module.

30. A system for estimating a location using ultrasonic waves and for generating sound at a sweet spot, the system comprising:
a remote controller which transmits a plurality of signals including infrared signals and ultrasonic signals; and
a receiver which receives the plurality of signals, measures time delays between an infrared signal and ultrasonic signals included in each of the received signals, estimates the location of the remote controller with respect to each of the received signals using the measured time delays, estimates the final location of the remote controller based on the estimated locations of the remote controller, and generates sound such that the sweet spot is generated at the final location of the remote controller.

31. The system of claim 30, wherein the receiver comprises:
an infrared signal receiving module which receives the infrared signal;
a first ultrasonic signal receiving module which receives the ultrasonic signal;
a second ultrasonic signal receiving module which is separated from the first ultrasonic signal receiving module by a predetermined distance and receives the ultrasonic signal;
a time delay calculating module which measures an origination time of the ultrasonic signal using the infrared signal and measures a first time delay between the measured origination time of the ultrasonic signal and the receipt time of the ultrasonic signal by a first ultrasonic wave receiving sensor and a second time delay between the measured origination time of the ultrasonic signal and the receipt time of the ultrasonic signal by a second ultrasonic wave receiving sensor; and
a location calculating module which estimates the location of the remote controller with respect to each of the received signals using the measured time delay and estimates the final location of the remote controller based on the estimated locations of the remote controller.

32. The system of claim 31, wherein the ultrasonic signals are transmitted from the remote controller after the infrared signal is transmitted.

33. The system of claim 31, wherein the infrared signal includes a plurality of pulse groups.

34. The system of claim 31, wherein the location calculating module comprises:
a location information calculating module which calculates first distance information between the remote controller and the first ultrasonic receiving sensor using the first time delay and calculates second distance information between the remote controller and the second ultrasonic receiving sensor using the second time delay;
a location estimating module which estimates a location of the remote controller with respect to each of the received signals using the first distance information, the second distance information, and third distance information between the first ultrasonic receiving sensor and the second ultrasonic receiving sensor; and
a final location determining module which estimates the final location of the remote controller using the estimated locations of the remote controller.

35. The system of claim 31, wherein the location calculating module further comprises a temperature sensor module which measures the temperature of air, and the distance information calculating module calculates distance information using the speed of air adjusted according to a change in the temperature of air measured by the temperature sensor module.

36. The system of claim 31, wherein the location calculating module selects the remaining locations of the remote controller among the estimated locations of the remote controller, except for locations having abnormal coordinates, calculates an average of the selected locations, and estimates the calculated average as the final location of the remote controller.

37. A system for estimating a location using ultrasonic waves and for generating sound at a sweet spot, the system comprising:
a remote controller which transmits a plurality of signals including infrared signals and ultrasonic signals; and
a receiver which receives the plurality of signals, measures time delays between an infrared signal and ultrasonic signals included in each of the received signals, calculates an average of the measured time delays for the received signals, estimates the location of the remote controller using the calculated averages, and generates sound such that the sweet spot is generated at the location of the remote controller.

38. The system of claim 37, wherein the receiver comprises:
an infrared signal receiving module which receives the infrared signal;
a first ultrasonic signal receiving module which receives the ultrasonic signal;
a second ultrasonic signal receiving module which is separated from the first ultrasonic signal receiving module by a predetermined distance and receives the ultrasonic signal;
a time delay calculating module which measures an origination time of the ultrasonic signal using the infrared signal, measures a first time delay between the measured origination time of the ultrasonic signal and the receipt time of the ultrasonic signal by a first ultrasonic wave receiving sensor and a second time delay between the measured origination time of the ultrasonic signal and a receipt time of the ultrasonic signal by a second ultrasonic wave receiving sensor, and calculates an average of the first time delays measured for the received signals and an average of the second time delays measured for the received originating signals; and
a location calculating module which estimates the location of the remote controller using the calculated averages.

39. The system of claim 38, wherein the ultrasonic signals are transmitted from the remote controller after the infrared signal is transmitted.

40. The system of claim 38, wherein the infrared signal includes a plurality of pulse groups.

41. The system of claim 38, wherein the time delay calculating module checks if the first time delay or the second time delay has an abnormal value and calculates a first average time delay of first time delays and a second average time delay of second time delays with respect to the remaining signals except for signals having abnormal values.

42. The system of claim 38, wherein the location calculating module comprises:
a distance information calculating module which calculates first distance information between the remote controller and the first ultrasonic receiving sensor using the first time delay and calculates second distance information between the remote controller and the second ultrasonic receiving sensor using the second time delay; and
a location estimating module which estimates the location of the remote controller with respect to each of the received signals using the first distance information, the second distance information, and third distance information between the first ultrasonic receiving sensor and the second ultrasonic receiving sensor.

43. The system of claim 42, wherein the location calculating module further comprises a temperature sensor module which measures the temperature of air, and the distance information calculating module calculates distance information using the speed of air adjusted according to a change in the temperature of air measured by the temperature sensor module.

44. At least one computer readable medium storing instructions that control at least one processor to perform a method for estimating a location of a remote controller using ultrasonic waves and for generating sound at a sweet spot, the method comprising:
receiving a plurality of signals transmitted from the remote controller;
measuring time delays between an infrared signal and an ultrasonic signal included in each of the received signals;
estimating locations of the remote controller with respect to each of the received signals using the measured time delays;
estimating the final location of the remote controller based on the estimated locations of the remote controller, and
generating sound such that the sweet spot is generated at the final location of the remote controller.

45. At least one computer readable medium storing instructions that control at least one processor to perform a method for estimating a location of the remote controller using ultrasonic waves and for generating sound at a sweet spot, the method comprising:
receiving a plurality of signals transmitted from a remote controller;
measuring time delays between an infrared signal and an ultrasonic signal included in each of the received signals;
calculating an average of time delays measured for the received signals;
estimating the location of the remote controller using the calculated averages; and
generating sound such that the sweet spot is generated at the location of the remote controller.

46. A method for estimating a location of a remote controller and for generating sound at sweet spot, the method comprising:
receiving an infrared signal and an ultrasonic signal from the remote controller;
measuring a first time delay between the received infrared signal and the ultrasonic signal received by a first sensor;
measuring a second time delay between a received infrared signal and the ultrasonic signal received by a second sensor;
estimating the location of the remote controller based on the first time delay, the second time delay, and predetermined locations of the first and second sensors; and
generating sound such that the sweet spot is generated at the location of the remote controller.

47. At least one computer readable medium storing instructions that control at least one processor to perform a method for estimating a location of a remote controller and for generating sound at sweet spot, the method comprising:
receiving an infrared signal and an ultrasonic signal;
measuring a first time delay between the received infrared signal and the ultrasonic signal received by a first sensor;
measuring a second time delay between a received infrared signal and the ultrasonic signal received by a second sensor;
estimating the location of the remote controller based on the first time delay, the second time delay, and predetermined locations of the first and second sensors; and
generating sound such that the sweet spot is generated at the location of the remote controller.

* * * * *

UNITED STATES PATENT AND TRADEMARK OFFICE
CERTIFICATE OF CORRECTION

| | | |
|---|---|---|
| PATENT NO. | : 7,535,798 B2 | Page 1 of 1 |
| APPLICATION NO. | : 11/397721 | |
| DATED | : May 19, 2009 | |
| INVENTOR(S) | : Dong-geon Kong et al. | |

It is certified that error appears in the above-identified patent and that said Letters Patent is hereby corrected as shown below:

Column 17, Line 12 claim 24, after "calculated" delete "an".

Column 20, Line 10 claim 44, change "controller," to --controller;--.

Signed and Sealed this

First Day of September, 2009

David J. Kappos
*Director of the United States Patent and Trademark Office*